Figure 1:
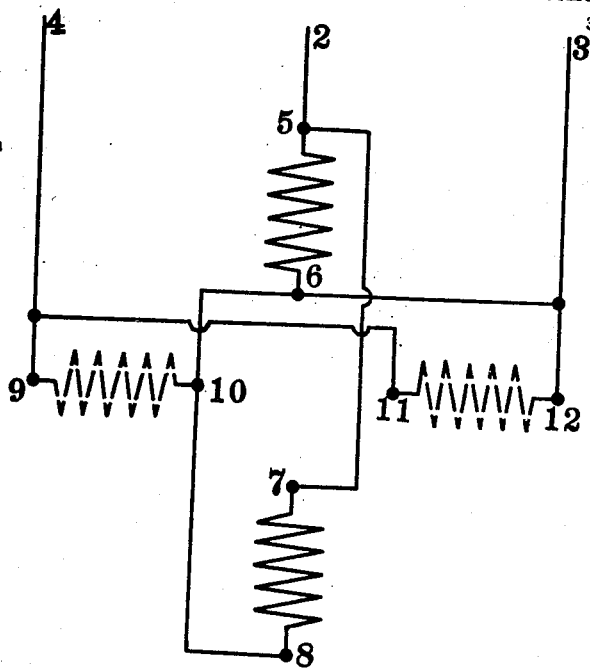

H. W. DOUBRAVA & J. HEINEMAN.
METHOD OF OPERATING POLYPHASE MOTORS.
APPLICATION FILED APR. 13, 1914.

1,156,136.

Patented Oct. 12, 1915.

3 SHEETS—SHEET 1.

WITNESSES:

INVENTORS:
H. W. Doubrava
Joseph Heineman
BY
E. E. Huffman
ATTORNEY

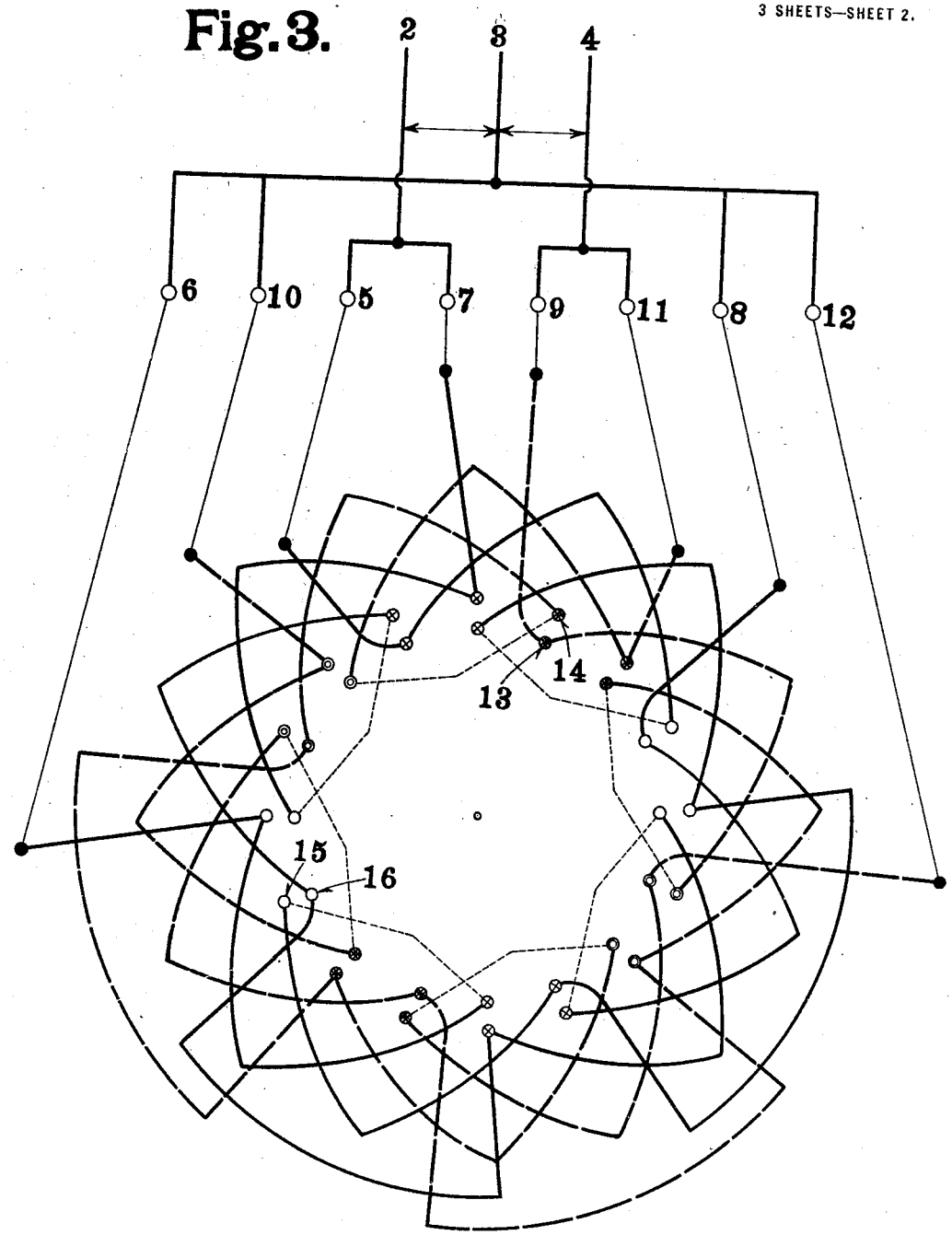

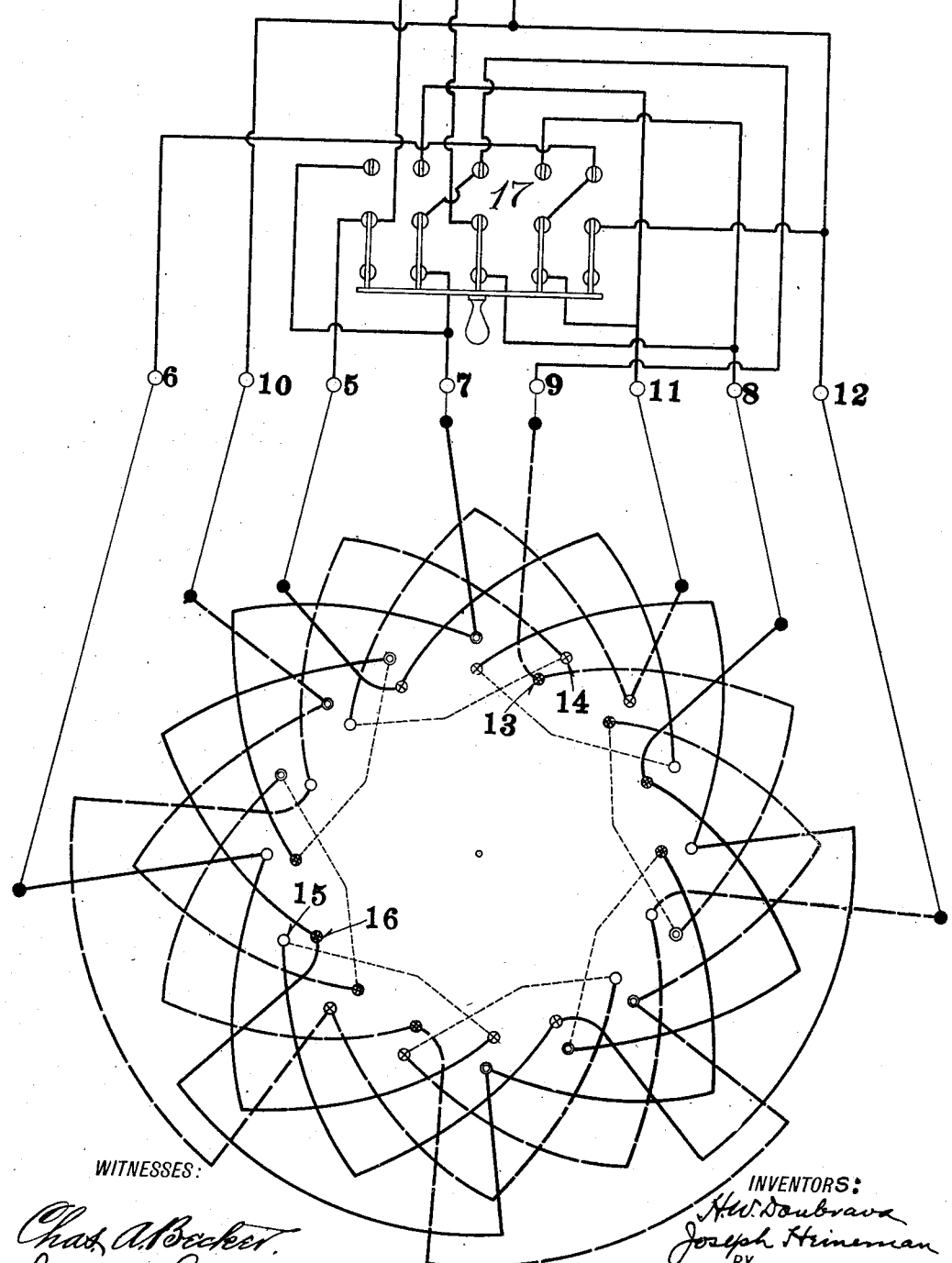

UNITED STATES PATENT OFFICE.

HARRY W. DOUBRAVA, OF HACKENSACK, NEW JERSEY, AND JOSEPH HEINEMAN, OF NEW YORK, N. Y., ASSIGNORS TO WAGNER ELECTRIC MANUFACTURING COMPANY, OF ST. LOUIS, MISSOURI, A CORPORATION OF MISSOURI.

METHOD OF OPERATING POLYPHASE MOTORS.

1,156,136.   Specification of Letters Patent.   Patented Oct. 12, 1915.

Application filed April 13, 1914.  Serial No. 831,435.

*To all whom it may concern:*

Be it known that we, HARRY W. DOUBRAVA and JOSEPH HEINEMAN, citizens of the United States of America, residing at Hackensack, New Jersey, and New York city, New York, respectively, have invented a certain new and useful Method of Operating Polyphase Motors, of which the following is such a full, clear, and exact description as will enable any one skilled in the art to which it appertains to make and use the same, reference being had to the accompanying drawings, forming part of this specification.

Our invention relates to polyphase motors, and its object is to enable the starting torque and current of these motors to be adjusted without the use of external appliances either in the stator or rotor circuits, thus making them adaptable to a wider range of operating conditions.

It is usual to so arrange the inducing windings of polyphase motors as to spread each motor phase over one-half of each pole for two-phase motors and over one-third of each pole for three-phase motors. It is also quite usual to subdivide each motor phase into at least two groups, which may be connected either in parallel or in series, thus making one and the same motor readily convertible for use on two line voltages—either on 110 and 220, or on 220 and 440 volts, for example. A machine operating on a voltage for which the two groups of each motor phase are connected in parallel, can be started in that connection, when it will take a very large starting current and develop a powerful torque; or, the two groups of each motor phase can be connected in series at starting, when the starting torque will be reduced to one-quarter of that obtained in the normal running connection, with a corresponding reduction of current. Now, we have found that the starting torque obtained in the normal running connection is usually too great, while that secured by connecting the groups of each motor phase in series is usually too small, and our invention relates to means whereby an intermediate torque can be readily secured.

In carrying out our invention, we "mix" the motor phases at starting, connecting one group of one motor phase in series with a group of another motor phase, thus each phase of the supply will be connected to one group of one motor phase in series with one group of another motor phase. By this means, we spread each motor phase over more than one-half of each pole in a two-phase motor and over more than one-third of each pole in a three-phase motor. Since the number of magnetic lines produced by a winding is directly dependent on the voltage at the terminals thereof, and inversely proportional to the number of series-connected conductors in said winding and to the spreading co-efficient thereof, it is clear that, by spreading the winding over a larger portion of the pole and thereby reducing the spreading co-efficient, we increase the number of lines and, therefore, the torque produced for a given voltage. Broadly speaking, therefore, our invention consists in so arranging the motor connections at starting as to increase the spreading of each motor phase so as to distribute each motor phase over a greater portion of each pole than that over which it is distributed in the normal running connection.

Figure 2:
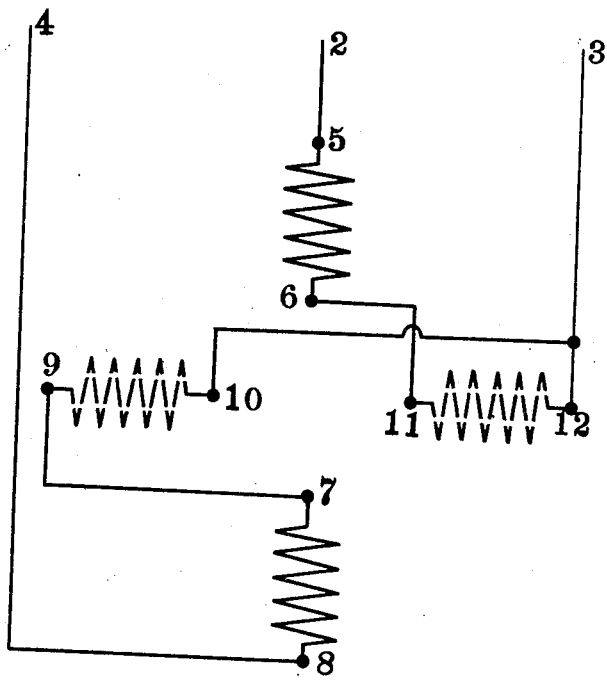

In the accompanying drawings, Figure 1 shows a two-pole two-phase inducing winding with two parallel connected groups in each phase, while Fig. 2 illustrates our invention as applied to Fig. 1. Fig. 3 shows a four-pole inducing winding of the diamond type in its running connection, with two parallel connected groups per phase, while Fig. 4 shows our invention applied to Fig. 3.

Referring to Fig. 1, one phase of the two-pole inducing winding illustrated therein comprises the groups 5, 6 and 7, 8; the other, the groups 9, 10 and 11, 12. The first mentioned groups are connected to the supply phase 2, 3, while the last mentioned groups are connected to the supply phase 4, 3. In applying our invention to the inducing windings shown in Fig. 1, we connect the group 5, 6 of one phase in series with the group 11, 12 of the other and to the supply phase 2, 3; and connect the group 7, 8 of one phase in series with the group 9, 10 of the other and to the supply phase 4, 3.

In Fig. 3, is shown a four-pole diamond winding located in 16 slots, with two coil sides or two independent conductors, such as 13, 14 or 15, 16 in each slot. Each phase of this winding is divided into two parallel connected groups. One of the phases comprises the groups located between the terminals 5, 6 and 7, 8 which are shown in full lines. The other phase is shown in dash lines and comprises the groups 9, 10 and 11, 12. The direction of the currents in that portion of the conductors which is located in the slots is indicated by single circles and single crosses for the one phase and by double circles and double crosses for the other phase, the crosses representing a direction of the current from front to back of the paper plane, while the circles represent the opposite direction of the current. It is seen that each phase is distributed over one-half of each pole, as is usual in two-phase motors. In applying our invention to a winding such as shown in Fig. 3, we connect the group 5, 6 of the full line phase in series with the group 11, 12 of the dash line phase to the supply phase 2, 3. We also connect the group 8, 7 of one phase in series with the group 9, 10 of the other to the line 4, 3 of the supply, with the result, illustrated in Fig. 4, that the spreading of each phase is now doubled, and embraces for each pole an arc equal to one pole pitch. The light dotted lines in the diagrams 3 and 4 indicate the back connections of the two diamond windings, while the points 5 to 12 inclusive indicate the terminals of the machine, and 2, 3 and 4 show the supply wires of a three-wire two-phase system. In the position shown, the switch 17 of Fig. 4 establishes the starting connections above described, while, in its other position, it establishes the running connections illustrated in Fig. 3.

Assuming that the number of conductors connected in series in each of the groups shown in Fig. 3 is eight, the terminal voltage 100, and the spreading co-efficient for the figure 3 is .89, then the number of lines produced by this winding will be 14.04X, X representing the other factors, aside from those mentioned, which determine the actual number of lines. When one group of each phase is connected in series between terminals with one group of another phase, as shown in Fig. 4, then the number of useful conductors is raised to 16, while the spreading co-efficient is reduced to .66. If the same voltage be applied to the terminals of this Fig. 4, the lines will be 9.49X. If, on the other hand, the two groups of each phase of Fig. 3 are connected in series, without mixing, then the number of useful conductors will also be raised to 16, but the spreading co-efficient will remain the same as before and the number of lines will be 7.02X. Since the torque is, in each case, proportional to the square of the number of lines, then if the torque for the normal connection, shown in Fig. 3, is assumed to be 100, for example, the torque developed with two groups of each phase connected in series will be 25, and that developed in a motor connected in accordance with our invention and as shown in Fig. 4, will be 45.5, or about one-half of the normal as against one-fourth of the normal to be obtained with the prior known connection. The starting current will vary approximately as the starting torque.

Having fully described our invention, what we claim as new and desire to secure by Letters Patent of the United States is:

1. The method of operating polyphase motors which comprises supplying, at starting, the current of at least one phase to inducing conductors distributed over arcs aggregating a greater number of degrees than the aggregate of the arcs over which the inducing conductors extend to which the current of said phase is supplied in normal operation.

2. The method of operating polyphase motors which comprises supplying the current of each phase, at starting, to inducing conductors distributed over arcs aggregating a desired number of degrees and supplying the current of each phase to inducing conductors distributed over arcs aggregating a smaller number of degrees for normal operation of the machine.

3. The method of operating $n$-phase motors which comprises supplying the current of each phase to conductors distributed over arcs aggregating $720/n$ electrical degrees at starting and supplying the current of each phase to conductors distributed over arcs aggregating $360/n$ electrical degrees for normal operation.

4. The method of operating $n$-phase motors which comprises supplying, at starting, the current of each phase to inducing conductors distributed over more than $360/n$ electrical degrees and supplying, in normal operation, the current of each phase to inducing conductors distributed over a smaller number of electrical degrees.

5. The method of operating from a polyphase supply motors provided with a plurality of inducing windings displaced from each other, which comprises supplying at starting current from each supply phase to at least parts of two inducing windings displaced from each other, and supplying current from each supply phase to only one of the inducing windings in normal operation.

6. In combination, a source of polyphase alternating current, a motor provided with polyphase windings, each connected to one phase of the supply in normal operation, and means for supplying current from a single supply phase to at least parts of two of the motor phases at starting.

7. In combination, a source of polyphase alternating current, a motor provided with a plurality of inducing windings displaced from each other and each comprising at least two parts, means for connecting a part of one winding in series with part of another and with one supply phase at starting, and means for connecting the parts of each winding in parallel and to a single supply phase in normal operation.

In testimony whereof, we have hereunto set our hands and affixed our seals in the presence of the two subscribing witnesses.

HARRY W. DOUBRAVA. [L. S.]
JOSEPH HEINEMAN. [L. S.]

Witnesses:
E. D. PIKE,
E. W. GOLDSCHMILT.

Copies of this patent may be obtained for five cents each, by addressing the "Commissioner of Patents, Washington, D. C."